(12) United States Patent
Kim et al.

(10) Patent No.: US 6,337,841 B1
(45) Date of Patent: Jan. 8, 2002

(54) COMPATIBLE OPTICAL PICKUP

(75) Inventors: Kun-Soo Kim; Jong-Ryull Kim; Myoung-Soo Choi; Hyung-Taek Oh; Jong-Hwa Yu, all of Suwon; Chul-Woo Lee, Sungnam; Kun-Ho Cho, Suwon; Pyong-Yong Seong, Songpa-gu Seoul; Jang-Hoon Yoo, Seoul, all of (KR)

(73) Assignee: SamSung Electronics Co., Ltd., Suwon (JP)

(*) Notice: Subject to any disclaimer, the term of this patent is extended or adjusted under 35 U.S.C. 154(b) by 0 days.

(21) Appl. No.: 09/425,887

(22) Filed: Oct. 25, 1999

(30) Foreign Application Priority Data

Oct. 23, 1998 (KR) .............................. 98-44620
Oct. 19, 1999 (KR) .............................. 99-45313

(51) Int. Cl.⁷ .................................. G11B 7/00
(52) U.S. Cl. ............................ 369/112.06; 369/112.08; 369/112.25
(58) Field of Search ........................... 369/44.23, 44.37, 369/103, 112.03, 112.05, 112.06, 112.07, 112.08, 112.1, 112.11, 112.13, 112.15, 112.22, 112.23, 112.25, 112.26

(56) References Cited

U.S. PATENT DOCUMENTS

| 5,446,565 | A | * | 8/1995 | Komma et al. | 369/44.23 |
| 5,875,167 | A | * | 2/1999 | Katayama | 369/44.37 X |
| 5,923,636 | A |   | 7/1999 | Haruguchi et al. | |
| 5,930,219 | A |   | 7/1999 | Kim | |
| 6,084,710 | A | * | 7/2000 | Katsuma | 369/112.06 X |
| 6,094,308 | A | * | 7/2000 | Katsuma | 369/112.06 X |

FOREIGN PATENT DOCUMENTS

| JP | 09-054973 | 2/1997 |
| JP | 09-306018 | 11/1997 |
| JP | 10-124903 | 5/1998 |
| JP | 10-283668 | 10/1998 |
| NL | 1008739 | 9/1998 |

OTHER PUBLICATIONS

Japanese Patent Office Action, dated Jul. 3, 2001.

* cited by examiner

Primary Examiner—Paul W. Huber
(74) Attorney, Agent, or Firm—Robet E. Bushnell, Esq.

(57) ABSTRACT

A compatible optical pickup capable of recording or reproducing information on or from compact disc (CD) family media such as CD rewritable (CD-RW) and digital versatile disc (DVD) by adopting a stepped planar lens having a plurality of gratings. The compatible optical pickup includes a first optical source for emitting a first light beam having a predetermined wavelength; a second optical source for emitting a second light beam having a long wavelength relative to the first light beam; an optical path changing element for changing the traveling path of an incident light beam; an objective lens for condensing the first and second light beams onto optical discs having different thicknesses, respectively; an optical diffraction element having a first region which directly transmits the first and second light beams incident thereto, and a second region bounding the first region, which directly transmits the incident first light beam and diffractingly transmits the second light beam toward an optical axis; and a photodetector for detecting an information signal and an error signal from the first and second light beam which have been reflected by the optical discs and passed through the optical path changing element. Also, the optical diffraction element is a stepped planar lens in which one or more stepped pattern periods each having a plurality of annular gratings are arranged in the second region, wherein the depths of the gratings become smaller moving away from the optical axis, and the maximum depth thereof is a predetermined value.

34 Claims, 11 Drawing Sheets

COMPATIBLE OPTICAL PICKUP

CLAIM OF PRIORITY

This application makes reference to, incorporates the same herein, and claims all benefits accruing under 35 U.S.C. § 119 from an application entitled COMPATIBLE OPTICAL PICKUP earlier filed in the Korean Industrial Property Office on the 23$^{rd}$ day of Oct. 1998, and there duly assigned Serial No. 44620/1998, a copy of which is annexed hereto.

BACKGROUND OF THE INVENTION

1. Field of the Invention

The present invention relates to an optical process and apparatus for writing and reading on a variety of otherwise incompatible optical memories generally, and more particularly, to an optical pickup incorporating a planar lens having a stepped grating, capable of recording or reproducing information on or from a Compact Disc (CD) family media including a CD rewritable (CD-RW) and a Digital Versatile Disc (DVD, also called Digital Video Disc).

2. Description of the Related Art

We have found that the proliferation of varying optical media formats has created a need for a single apparatus compatible with the assorted optical media. Recently, there is a need for an optical recording and/or reproducing apparatus capable of recording and/or reproducing information on and/or from a DVD at a high density and be compatible with the CD family media such as CD, recordable CD (CD-R), CD-RW, CD interactive (CD-I) and CD plus graphics (CD+G). A single apparatus able to read and write all the varying formats is much more economical and efficient to use.

The standard thickness of existing CD family media is 1.2 mm, whereas the thickness of DVDs has been standardized to 0.6 mm in consideration of the allowable error in the tilt angle of a disc and the numerical aperture (NA) of an objective lens. Accordingly, when recording or reproducing information on or from a CD using an optical pickup for DVDs, spherical aberrations occur due to a difference in the thicknesses between these two types of discs. Such spherical aberration cannot provide a light intensity sufficient for recording an information (radio frequency) signal or may deteriorate the signal reproduced from the CD. Also, DVDs and CD family media utilize different wavelengths for light for reproduction. CDs use light having a wavelength of about 780 nm as a light source for reproduction, whereas DVDs use light having a wavelength of about 650 nm as a light source therefor. Thus, an optical pickup compatible with CDs, having an optical source capable of emitting different wavelengths of light, and a structure in which optical spots can be formed at different focal positions is required.

An exemplar of the prior art, Haruguchi et al. (U.S. Pat. No. 5,923,636, Optical Pickup, Jul. 13, 1999) discloses an optical pickup for recording on and reproduction from recording media of different recording densities such as CD and DVD. A diaphram means is used to vary the diameter of a light beam incident upon an objective lens. The objective lens is used to focus the beam on the media.

Kim (U.S. Pat. No. 5,930,219, Optical Pickup Device for Discs of Varying Characteristics, Jul. 27, 1999) discloses an optical pickup apparatus which is capable of reading data from and writing to discs of varying densities and thicknesses. The Kim '219 patent controls the numerical aperture of an objective lens by using a Liquid Crystal Shutter (LCS) and a diffraction hologram. The diffraction hologram has gratings which are of uniform depth which diffracts certain types of light. The diffraction hologram alone is not enough to record and read CDs and DVDs. The added element of the LCS is necessary.

SUMMARY OF THE INVENTION

An object of the present invention is to provide an optical pickup capable of reading and writing on a variety of incompatible optical memory formats.

Another object of the present invention is to be able to read and write on optical media of differing thicknesses and densities.

Another object of the present invention is to avoid using a variable diaphragm in an optical pickup. A variable diaphragm is manufactured through a sophisticated and expensive process.

Another object of the present invention is to provide a compatible optical pickup capable of recording or reproducing information on or from digital versatile discs (DVDs) and compact disc (CD) family media including CDs, recordable CDs (CD-Rs) and CD rewritables (CD-RWs), by adopting a planar lens having a stepped grating, which directly and diffractingly transmits light incident thereto according to the wavelength of light.

These and other objects may be attained with a process and a compatible optical pickup that uses a first optical source for emitting a first light having a predetermined wavelength; a second optical source for emitting a second light having a long wavelength relative to the first light; a beam splitter that changes the traveling path of an incident light; an objective lens for condensing the first and second lights onto optical discs having different thicknesses, respectively; an optical diffractor having a first region which directly transmits the first and second light incident thereto, and a second region bounding the first region, that directly transmits the incident first light and diffractingly transmits the second light toward an optical axis; and a photodetector for sensing information signals and error signals from the first and second light which have been reflected by the optical discs and passed through the optical path changing means.

In another aspect of the present invention, there is provided a compatible optical pickup with a first optical unit including a first light source for emitting a first light having a wavelength of 650 nm, and a first photodetector for receiving the first light; a second optical unit including a second light source for emitting a second light having a wavelength of 780 nm, and a second photodetector for receiving the second light; a polarization beam splitter for changing the paths of the first and second light; an objective lens for condensing the first and second lights to form optical spots onto optical discs having different thicknesses; and an optical diffractor having a first region which directly transmits the first and second light incident thereto, and a second region bounding the first region, which directly transmits the incident first light and diffractingly transmits the second light toward an optical axis.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
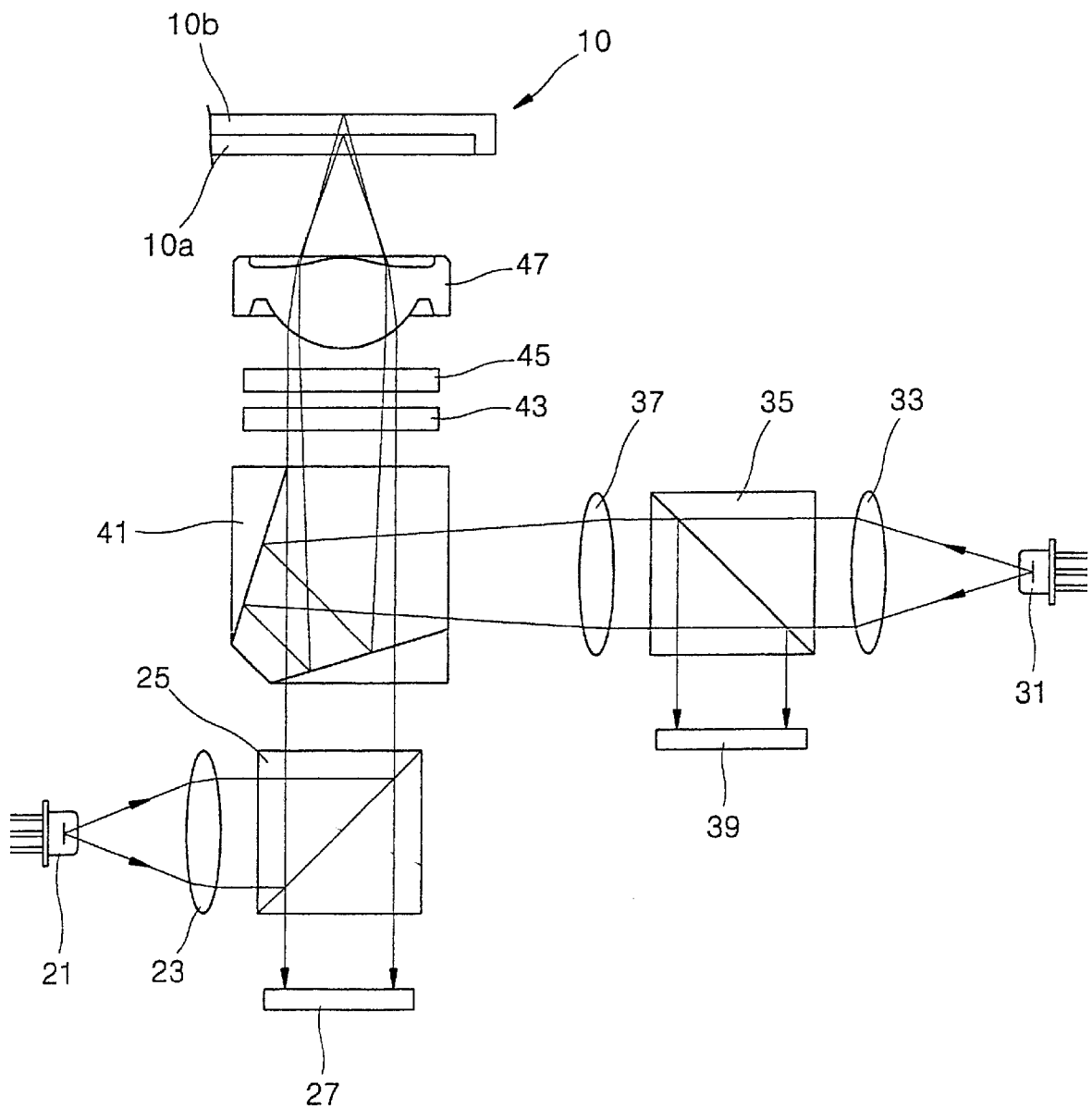
FIG. 1 is a schematic view showing the optical arrangement of a compatible optical pickup.

Referring to FIG. 1, a compatible optical pickup comprises a first optical source 21 for emitting light having a wavelength of about 650 nm and a second optical source 31 for emitting light having a wavelength of about 780nm. The first optical source 21 is appropriate for a relatively thin disc 10a, such as DVDs, and the second optical source 31 is appropriate for a relatively thick disc 10b such as CDs. Light emitted from the first optical source 21 is condensed by a first collimator lens 23, parallelly incident onto a first polarization beam splitter (PBS) 25, and then reflected by the first PBS 25 toward the thin disc 10A. After reflected by the thin disc 10a, the reflected light is transmitted through the first PBS 25 and is then received by a first photodetector 27. Here, an interference filter 41 for changing the paths of light emitted from the first and second optical sources 21 and 31, a ¼-wavelength plate 43, a variable diaphragm 45 and an objective lens 47 for condensing light incident thereto are situated on an optical path between the first PBS 25 and the disc 10.

Light emitted from the second optical source 31 is condensed by a second collimator lens 33, parallel rays incident onto a second PBS 35, transmitted through a condenser lens 37, and then incident onto the interference filter 41. The light is reflected by the interference filter 41 and passes through the ¼-wavelength plate 43, the variable diaphragm 45 and the objective lens 47 in sequence to form an optical spot on the thick disc 10b.

Light reflected by the relatively thick disc 10b is incident onto the interference filter 41 through the objective lens 47, the variable diaphragm 45 and the ¼-wavelength plate 43, and then reflected by the interference filter 41 heading toward the second PBS 35. The light is reflected by the second PBS 35 and received by a second photodetector 39.

The interference filter 41, an optical element for transmitting or reflecting incident light depending on the wavelength of the incident light, transmits the light emitted from the first optical source 21 and reflects the light emitted from the second optical source 31. The ¼-wavelength plate 42 is an optical member for changing the polarization direction of the incident light. Light emitted from the first and second optical sources 21 and 31 pass through the ¼-wavelength plate 43 twice, heading toward the first and second PBSs 25 and 35 while the phase of the polarized light is delayed 90°.

Figure 2:
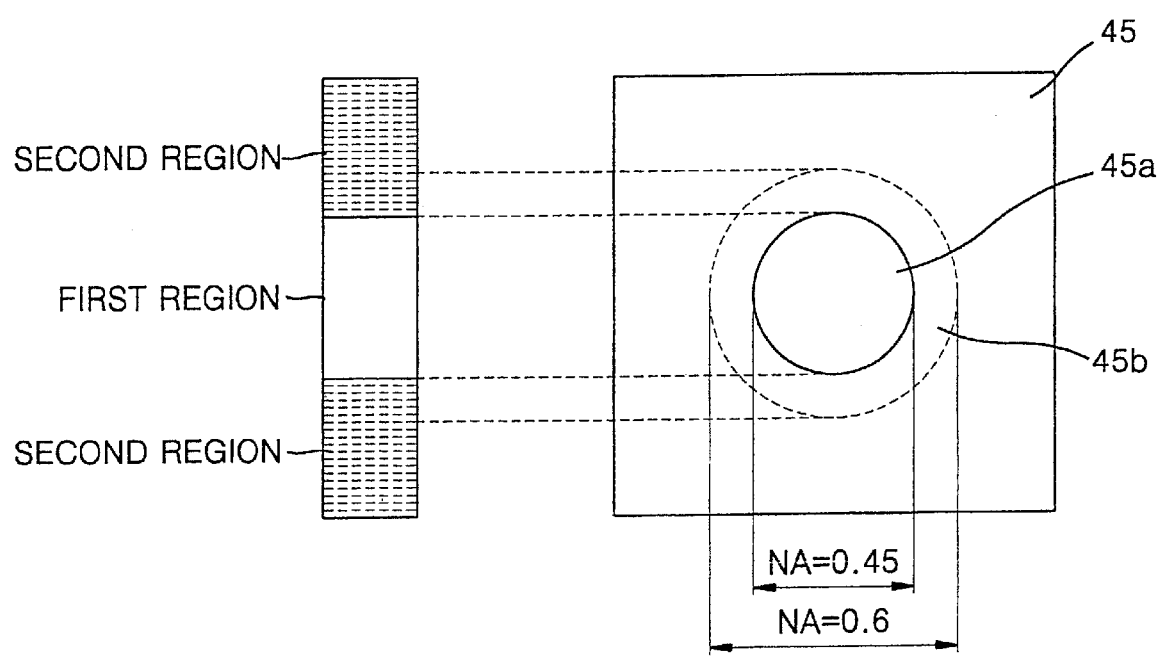
FIG. 2 is a schematic view of the variable diaphragm of FIG. 1.

Referring to FIG. 2, the variable diaphragm 45 comprises a first region 45a the size of which is variable, and a second region 45b bounding the first region 45a, and selectively transmits the incident light. The variable diaphragm 45 corresponds to a region of the objective lens 27 having a numerical aperture (NA) of 0.6 or less. The first region 45a, which corresponds to a region of the objective lens 47 having an NA of 0.45 or less, completely transmits the light emitted from the first and second optical sources 21 and 31. The second region 45b, which is coated with multiple dielectric thin films to a thickness on a micrometer scale, corresponds to a region of the objective lens having an NA of 0.45–0.6. That is, the second region 45b completely transmits light having a wavelength of 650 nm and completely reflects light having a wavelength of 780 nm. For the purpose of eliminating optical aberration occuring at the second region 45b, the first region 45a is formed of a SiO₂ thin film. The objective lens 47 condenses light emitted from the first and second optical sources 21 and 31 to form optical spots on the recording surface of the discs 10a and 10b, respectively.

The compatible optical pickup described above can be adopted to a CD-R by using two optical sources having different wavelengths. However, because the compatible optical pickup requires a variable diaphragm having first and second regions, which is manufactured through sophisticated and expensive processes, assembling of such optical pickup becomes complicated and costly. In addition, the variable diaphragm completely reflects the light for recording on a CD-R, which is emitted from the second optical source and incident onto a region having an NA of 0.45 or more, and thus it cannot be applied to an optical pickup for CD-RWs, which requires an NA of 0.5 or more and high optical efficiency for recording.

Figure 3:
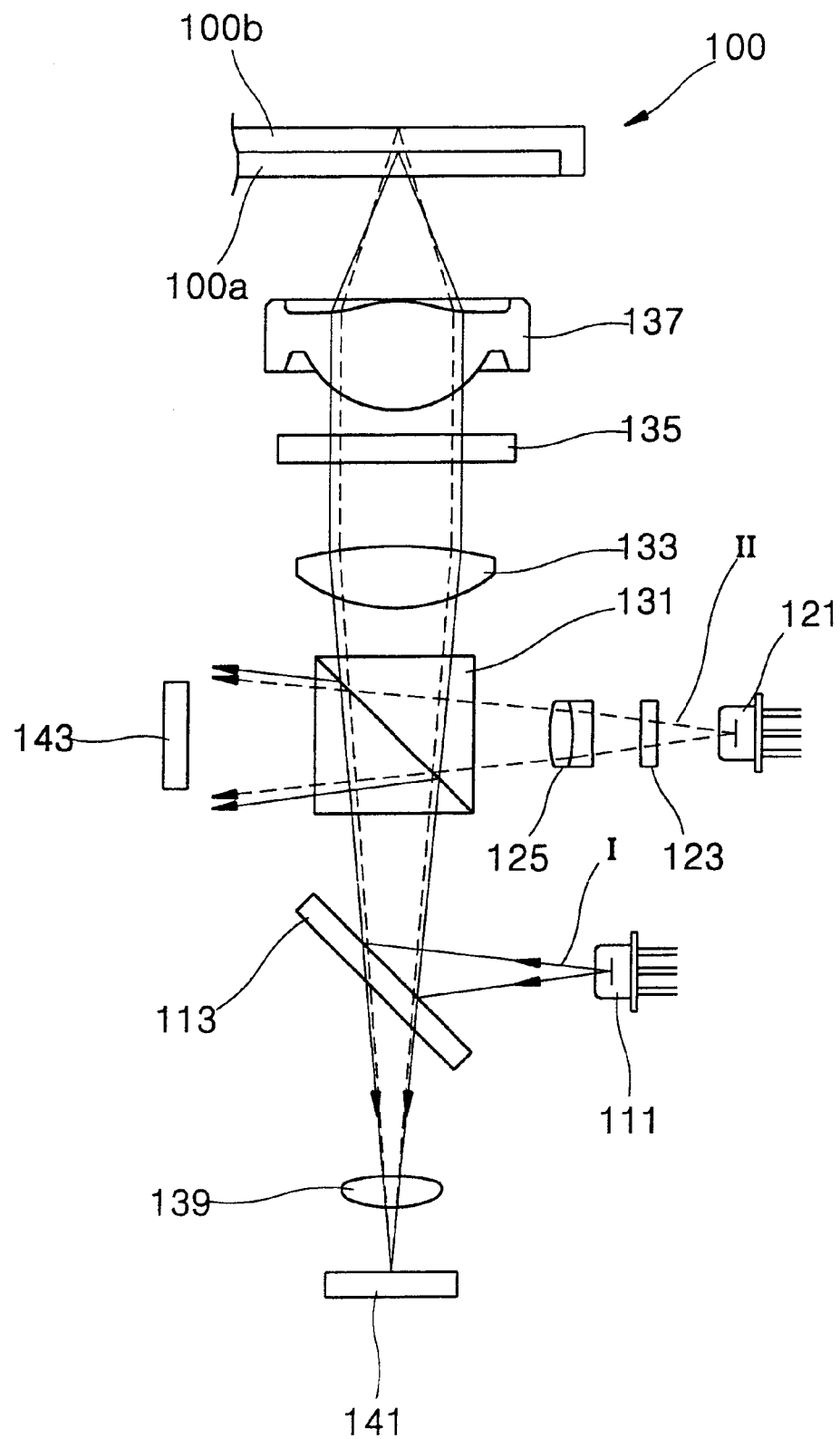
FIG. 3 is a schematic view showing the optical arrangement of a compatible optical pickup constructed as a preferred embodiment of the present invention.

Referring to FIG. 3, a compatible optical pickup according to a preferred embodiment of the present invention includes first and second optical sources 111 and 121 for emitting light having different wavelengths, an optical path changing means for changing the path of an incident light, an objective lens 137 for condensing the incident light so as to form an optical spot on an optical disc 100, an optical diffraction means, a photodetector 141 for detecting an information (radio frequency) signal and an error signal from the incident light which is reflected by the optical disc 100 and passes through the optical path changing means.

The first optical source 111 emits a first light I having a wavelength of about 650 nm. The emitted first light I is used to record or reproduce information on or from a relatively thin disc 100a such as a digital versatile disc (DVD). Also, the second optical source 121 emits a second light II having a wavelength of about 780 nm, and the emitted second light II is used to record or reproduce information on or from a relatively thick optical disc 100b such as a compact disc (CD) or a CD rewritable (CD-RW).

The optical path changing means includes a first beam splitter 113 for changing the traveling path of the first light I emitted from the first optical source 111, and a second beam splitter 131 disposed between the first beam splitter 113 and the objective lens 137, for changing the traveling path of the light incident thereto. The first beam splitter 113 makes the first light I incident from the first optical source 111 toward the optical disc 100, and the first and second lights I and II respectively, which have been reflected by the optical disc 100, toward the photodetector 141. The first beam splitter 113 may have a cubic structure besides the planar structure shown in FIG. 2. The second beam splitter 131 changes the traveling paths of the light incident thereto by partially transmitting or reflecting the first and second lights I and II incident thereto. In the case of having the optical arrangement shown in FIG. 3, the second beam splitter 131 reflects a part of the second light II emitted from the second optical source 121 such that it heads toward the optical disc 100, and transmits the rest of the second light II. Also, the second beam splitter 131 transmits a part of the first light I emitted from the first optical source 111 such that it heads toward the optical disc 100, and reflects the rest of the first light I. The second beam splitter 131 transmits a part of the light, which has been reflected by the optical disc 100, such that it heads toward the photodetector 141.

The compatible optical pickup according to the present embodiment may further be constructed with a monitoring detector 143 capable of detecting the output of light emitted from the first and second optical sources 111 and 121. The monitoring detector 143 detects the output of light emitted from the first and second optical sources 111 and 121, by receiving the first light I reflected by the second beam splitter 131, which has been emitted from the first optical source 111, and the second light III transmitted through the second beam splitter 131, which has been emitted from the second light source 121. Here, because the first and second optical sources 111 and 121 are selectively driven according to the type of adopted optical disc, the first and second light I and II are not received by the monitoring photodetector 143 at the same time.

Figure 4:
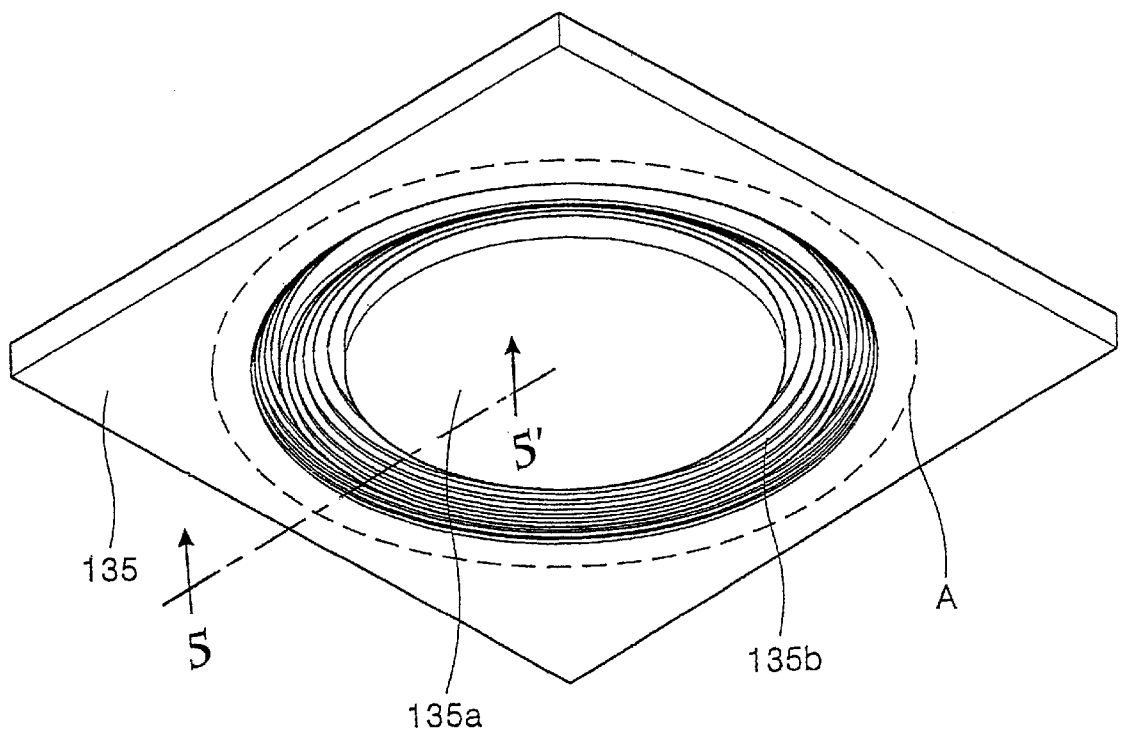
FIG. 4 is a perspective view of the stepped planar lens adopted as an embodiment of an optical diffraction means constructed according to the principles of the present invention.

The optical diffraction means may be a stepped planar lens 135 disposed on an optical path between the optical path changing means and the objective lens 137. The stepped planar lens 135 directly transmits the first light I and diffractingly transmits the second light II toward an optical axis. Referring to FIGS. 3 and 4, the stepped planar lens 135 has a first region 135a, which corresponds to a region of the objective lens 137 having a numerical aperture (NA) of 0.3 or less, and a second region 135b bounding the first region 135a, which corresponds to a region having an NA of 0.3–0.5. Also, the diameter of a region A indicated by dashed lines in FIG. 4 corresponds to the effective diameter of the objective lens 137 having an NA of 0.6.

The first region 135a is capable of directly transmitting the incident first and second light I and II, wherein it has no pattern. Meanwhile, the second region 135b has an annular grating pattern having a stepped section. The first region 135 has a 0th-order diffraction efficiency of about 100%, thereby directly transmitting both the first and second lights I and II. Here, the 0th-order diffraction efficiency is expressed as the percentage of the transmitted light with respect to the amount of an incident light.

The second region 135b has a 0th-order diffraction efficiency of about 100% with respect to the first light I incident thereto, and a 0th-order diffraction efficiency of about 0% with respect to the second light II incident thereto. Also, a 1st-order diffraction efficiency of the second region 135b with respect to the second light II is about 70%. Here, the 1st-order diffraction efficiency is expressed as the percentage of the 1st-order diffracted light with respect to the amount of incident light.

Figure 5:
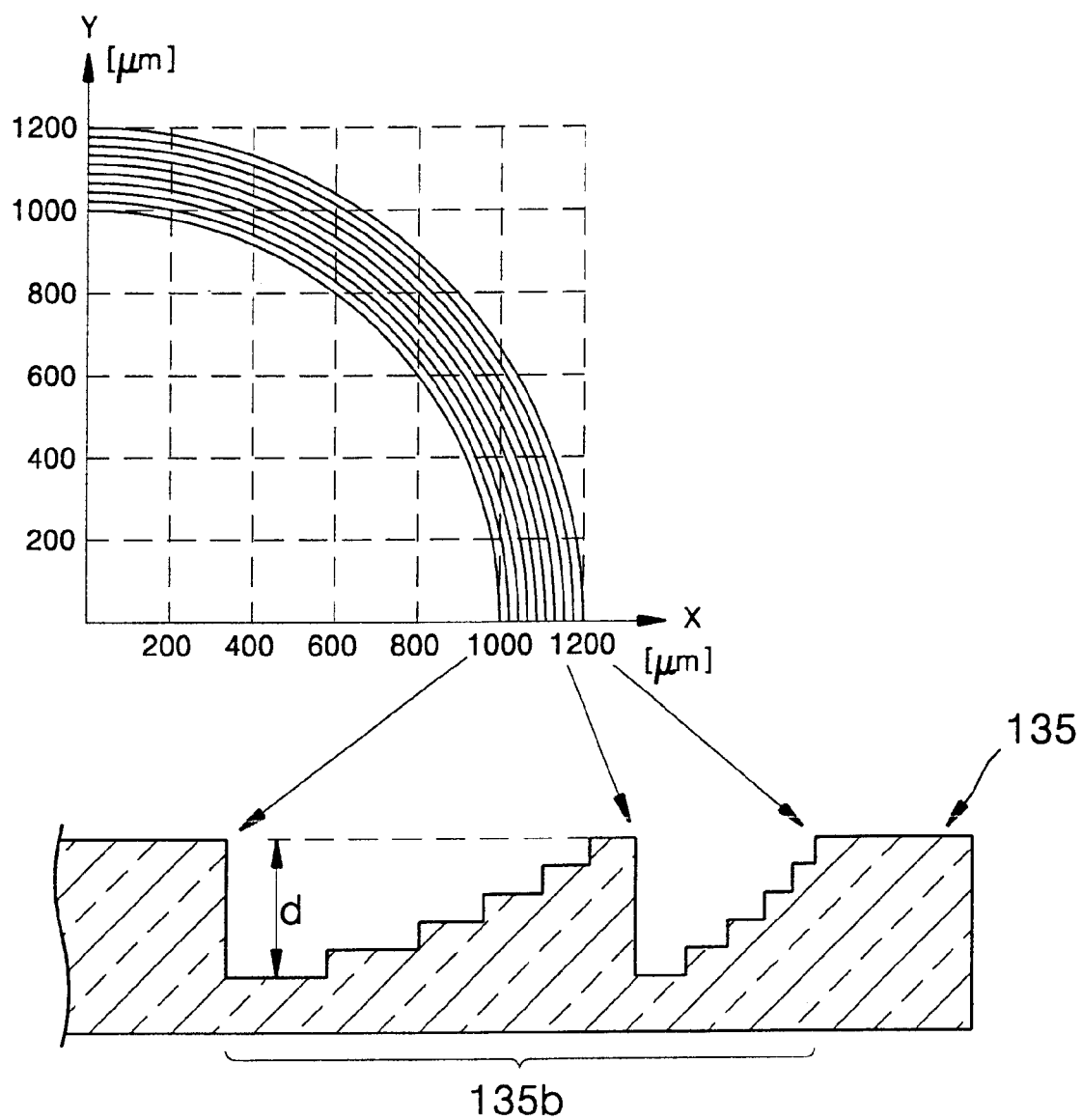
FIG. 5 shows a grating pattern formed in the second region of the stepped planar lens constructed according to the principles of the present invention.

FIG. 5 shows an example of a stepped pattern of the stepped planar lens 135. The graph of FIG. 5 shows the section of patterns formed on the quadrant I of the X-Y coordinate of FIG. 4, and the sectional view of FIG. 5 shows the stepped pattern of the second region 135b. Referring to FIG. 5, the stepped pattern is formed of a plurality of lattices whose depths become smaller as it moves farther away from the optical axis, wherein a maximum depth d of the stepped pattern is approximately 6.4 μm. Here, the stepped pattern may be repeated. That is, one stepped pattern may be formed within a radial range of 1000–1150 μm of the stepped planar lens 135, and another stepped pattern may be further formed within a radial range of 1150–1200 μm. Such stepped pattern of the stepped planar lens 135 is formed facing the optical path changing means. The maximum depth d of the pattern is determined by a method which will be explained later.

Figure 6:
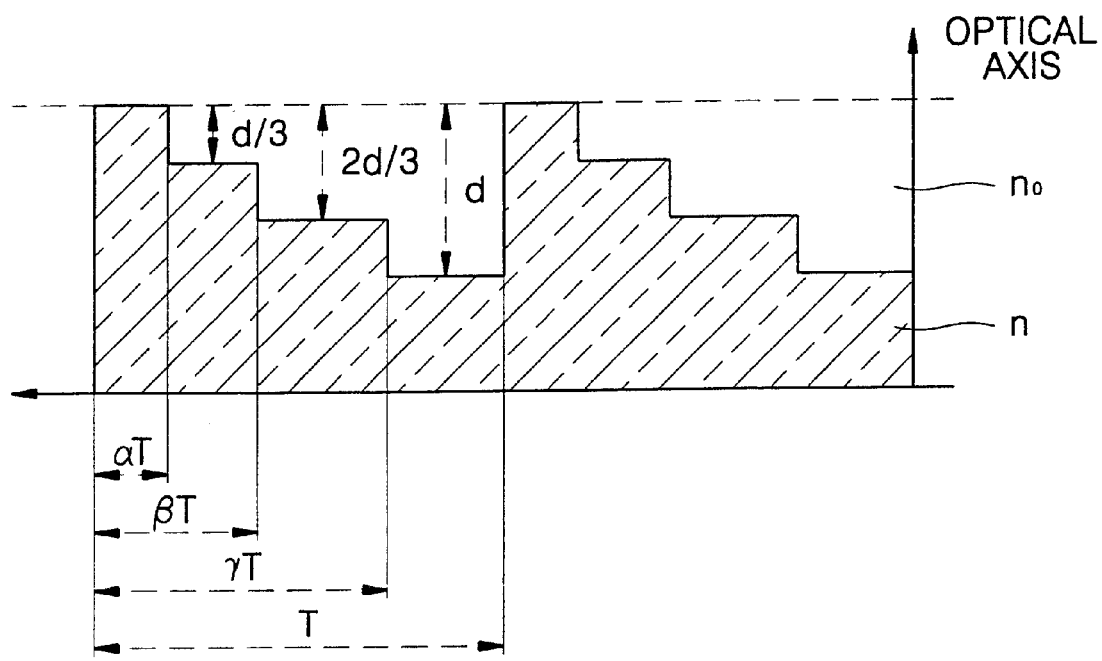
FIG. 6 is a diagram illustrating the diffraction efficiency according to the depth and interval of the grating pattern formed in the second region of the stepped planar lens constructed according to the principles of the present invention.

The diffraction efficiency of the stepped planar lens 135 is determined according to the interval and depth of the stepped pattern. Referring to FIG. 6, the vertical axis represents the optical axis of the stepped planar lens 135 and the horizontal axis represents the distance in a radial direction. Also, T represents one stepped pattern period, and α, β, γ, as coefficients which are equal to or greater than 0 and less than 1, satisfy the relationship of α<β<γ. Also, $n_0$ represents the refractive index of air, which is usually equal to 1, and $n_1$ represents a refractive index of the stepped planar lens 135.

Here, assuming that x represents an arbitrary position on the radial direction of the stepped planar lens 135, the stepped planar lens 135 has a transmission coefficient $T_m$ of the stepped planar lens 135 at each position in the radial direction, which is expressed by:

$$T_m = \frac{1}{T} \int_0^T \exp\left(\frac{2\pi i m}{T} x\right) T(x) dx \tag{1}$$

where m represents the order of diffraction, λ represents the wavelength, and d represents the maximum depth of the stepped pattern. The optical efficiency is equal to the absolute square of the transmission coefficient $T_m$. Also, from the equation (1), the transmission of the stepped planar lens 135 according to the section thereof is expressed by the following function (2)

$$T(x) = \begin{cases} 1.0, & 0 < x < \alpha T \\ \exp\left(\frac{2\pi i(n - n_0)d}{3\lambda}\right), & \alpha T < x < \beta T \\ \exp\left(\frac{4\pi i(n - n_0)d}{3\lambda}\right), & \beta T < x < \gamma T \\ \exp\left(\frac{6\pi i(n - n_0)d}{3\lambda}\right), & \gamma T < x < T \end{cases} \tag{2}$$

Also, the stepped planar lens 135 include gratings in stepped patterns, and the number of gratings in one stepped pattern period is expressed by:

$$N \approx \frac{\lambda_1}{(\lambda_2 - \lambda_1)} \qquad (3)$$

where N is an integer, which represents the number of gratings in one stepped pattern period, $\lambda_1$ represents the wavelength of the first light and $\lambda_2$ represents the wavelength of the second light.

Also, the step difference of each grating of the stepped planar lens 135 is equal to each other, 8 and such step difference causes a phase difference in the second light II, which satisfies the following equation (4), such that the phase difference of the second light II incident onto the first region 135a having an NA of 0.3 or less equals to that of the second light II incident onto the second region 135b, thereby eliminating spherical aberration.

$$\delta_i = \frac{2\pi i(n - n_0)d_i}{\lambda} \qquad (4)$$

where $\delta_i$ represents the optical phase difference by the i-th step difference from the optical center of the stepped planar lens and $d_i$ represents the depth of the i-th step difference.

Figure 7:
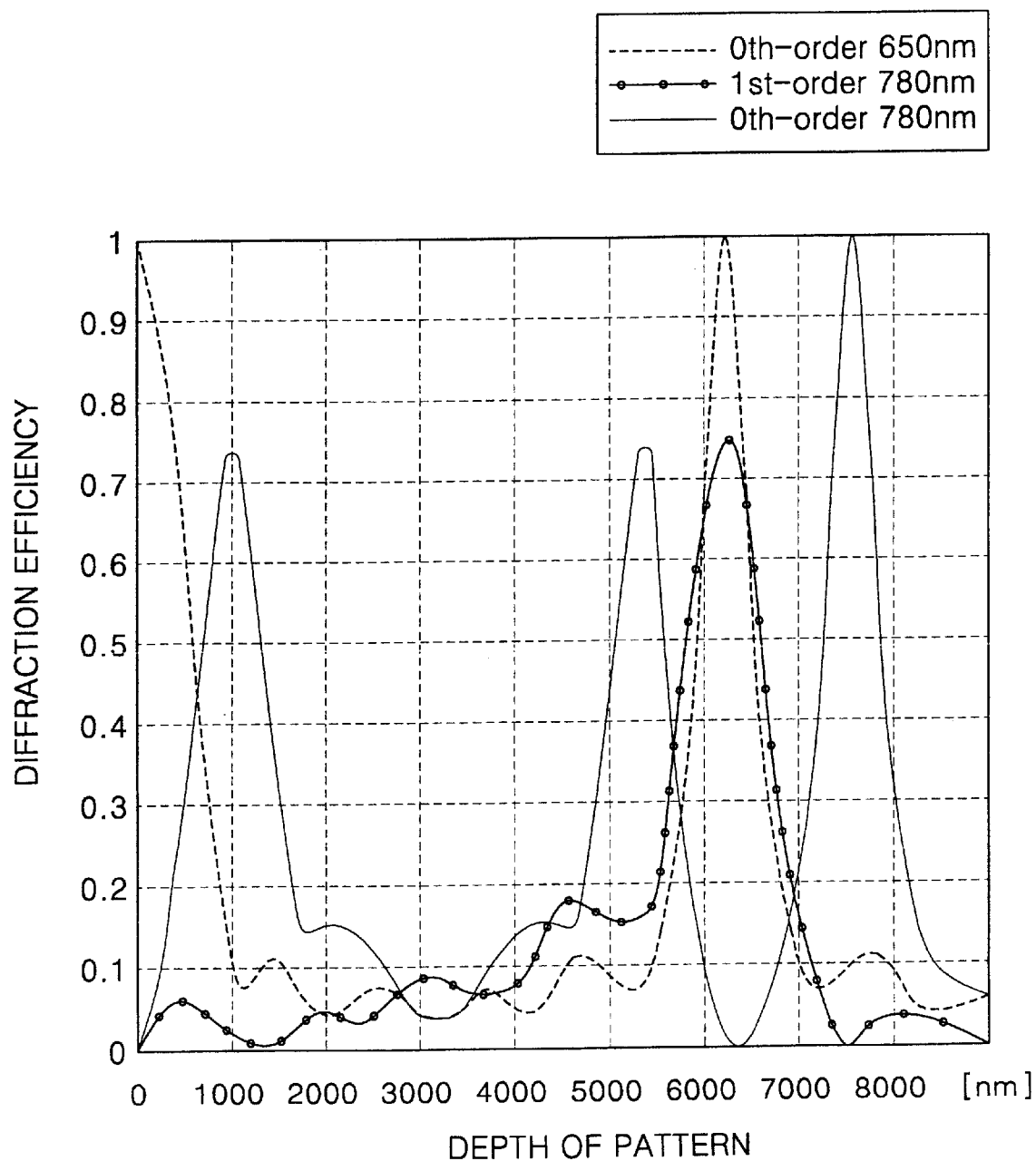
FIG. 7 is a graph showing the change in diffraction efficiency of the first and second lights of FIG. 6, constructed according to the depth of the grating pattern.

FIG. 7 is a graph showing the diffraction efficiency of light emitted from different optical sources according to the depth of the pattern, which is considered in designing a stepped planar lens. In FIG. 7, the X-axis represents the depth of the pattern, and the Y-axis represents the diffraction efficiency. A curve indicated by dotted lines represents the 0th-order diffraction efficiency with respect to the first light I, and a curve indicated by solid lines and with blank circles represents the—1th-order diffraction efficiency with respect to the second light II, and a curve indicated by solid lines represents the 0th-order diffraction efficiency with respect to the second light II. Here, the minus (−) means a diffraction toward the optical axis of the objective lens 137.

In the graph of FIG. 7, when the depth of the pattern is at about 6400 nm (6.4 μm), the 0th-order diffraction efficiency of the first light I is about 1 and that of the second light II is about 0. Also, the—1st-order diffraction efficiency of the second light II is about 0.75. Thus, preferably, the maximum depth d of the pattern of the stepped planar lens 135 according to the present invention is set to about 6.4 μm such that the 0th-order diffraction efficiency of the first light I in the second region 135b is about 100% and that of the second light II therein is close to 0%.

Figure 8:
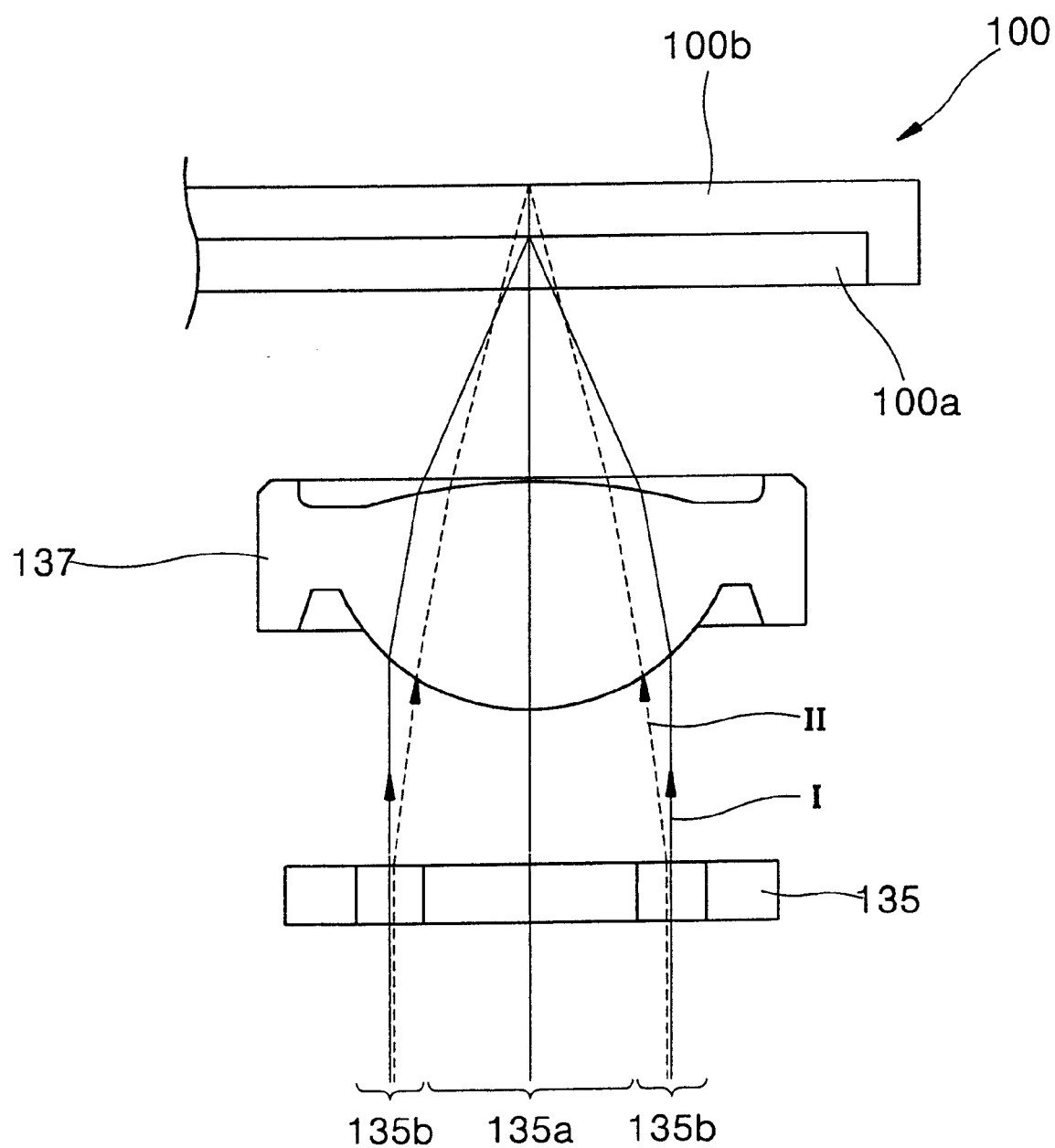
FIG. 8 is a partial view of a compatible optical pickup, for illustrating the operation of the stepped planar lens constructed according to the principles of the present invention.

Referring to FIG. 8, in the operation of the stepped planar lens 135, the stepped planar lens 135 directly transmits the first light I in both the first and second regions 135a and 135b. Also, the stepped planar lens 135 directly transmits the second light II in the first region 135a while diffractingly transmitting the second light II to the—1st-order in the second region 135b. Thus, a part of the first light I transmitted through the stepped planar lens 135 is incident onto a region of the objective lens 137, having a NA of 0.3–0.5, and condensed onto the thin optical disc 100a, whereas the second light II transmitted through the stepped planar lens 135 is incident onto a region of the objective lens 137, having an NA of 0.3 or less, and condensed onto the thick optical disc 100b. As described above, in the optical pickup of the present invention, the first and second lights I and II can be focused at different positions by disposing the stepped planar lens 135 on the optical path.

Referring to FIG. 3, the objective lens 137 has a NA of, for example, 0.6, to be appropriate for the formation of the relatively thin optical disc 100a, and condenses the incident first and second lights I and II to be focused onto the optical discs 100a and 100b, respectively. The photodetector 141 receives the lights respectively reflected by the optical discs 100a and 100b, and passed through the objective lens 137, the stepped planar lens 135 and the optical path changing means, to detect an error signal and an information (RF) signal from the received lights. Preferably, the optical pickup according to the present invention includes a grating 120, first and second collimator lenses 125 and 133, and a light receiving lens 139. The grating 123, which diffractingly transmits an incident light to detect a tracking error signal by a three-beam method, is disposed on the optical path between the second optical source 121 and the second beam splitter 131. The grating 123 diffractingly transmits light emitted from the second optical source 121 to be at least the 0-th and ±1-st order light.

The first and second collimator lenses 125 and 133 cause the incident light to converge to set the optical focal lengths between the first and second optical sources 111 and 121, and the optical discs 100. The first collimator lens 125 is disposed on the optical path between the second optical source 121 and the second beam splitter 131, and pre-condenses the emanated light emitted from the second optical source 121. The first collimator lens 125 makes the optical focal length short such that light emitted from the second optical source 121 is suitable for a CD-RW that requires a high optical efficiency. The second collimator lens 133 is disposed on the optical path between the objective lens 137, and the first and second optical sources 111 and 121, and collimates the light heading toward the optical disc 100.

Figure 9:
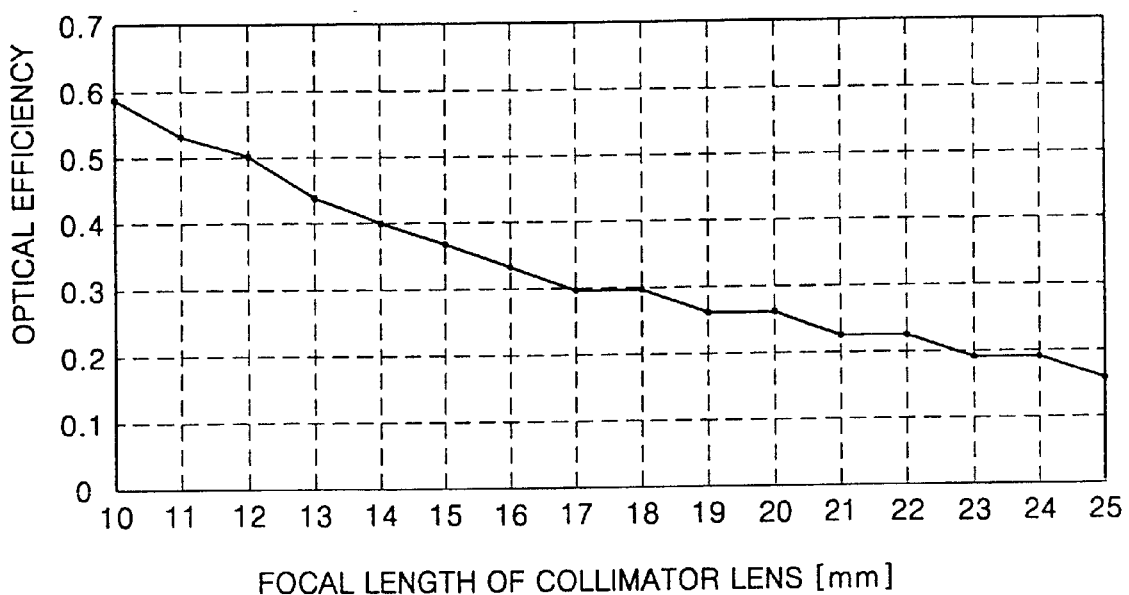
FIG. 9 is a graph illustrating a variation of optical efficiency with respect to the focal length of collimator lense.

FIG. 9 illustrates the optical efficiency with respect to the focal lengths of the first and second collimator lenses 125 and 133. As shown in FIG. 9, when the focal length of each of the first and second collimator lenses 125 and 133 are about 25 mm, the optical efficiency is 15.7% relative to the incident light, and 50.2% at a focal distance of 12 mm.

Thus, in the case where a CD-RW, which requires an optical power of 8–21 mW depending on the writing speed, is adopted as the thick optical disc 100b, the optical focal length can be shortened to about 12 mm by using the first collimator lens 125, thereby raising the optical efficiency. As a result, a desired optical power can be obtained, which is not absolutely dependent on the optical output from the second optical source 121.

The light receiving lens 139 is disposed between the first beam splitter 113 and the photodetector 141 and causes astigmatism of the light passing through the same to detect a focus error signal from the light.

Figure 10:
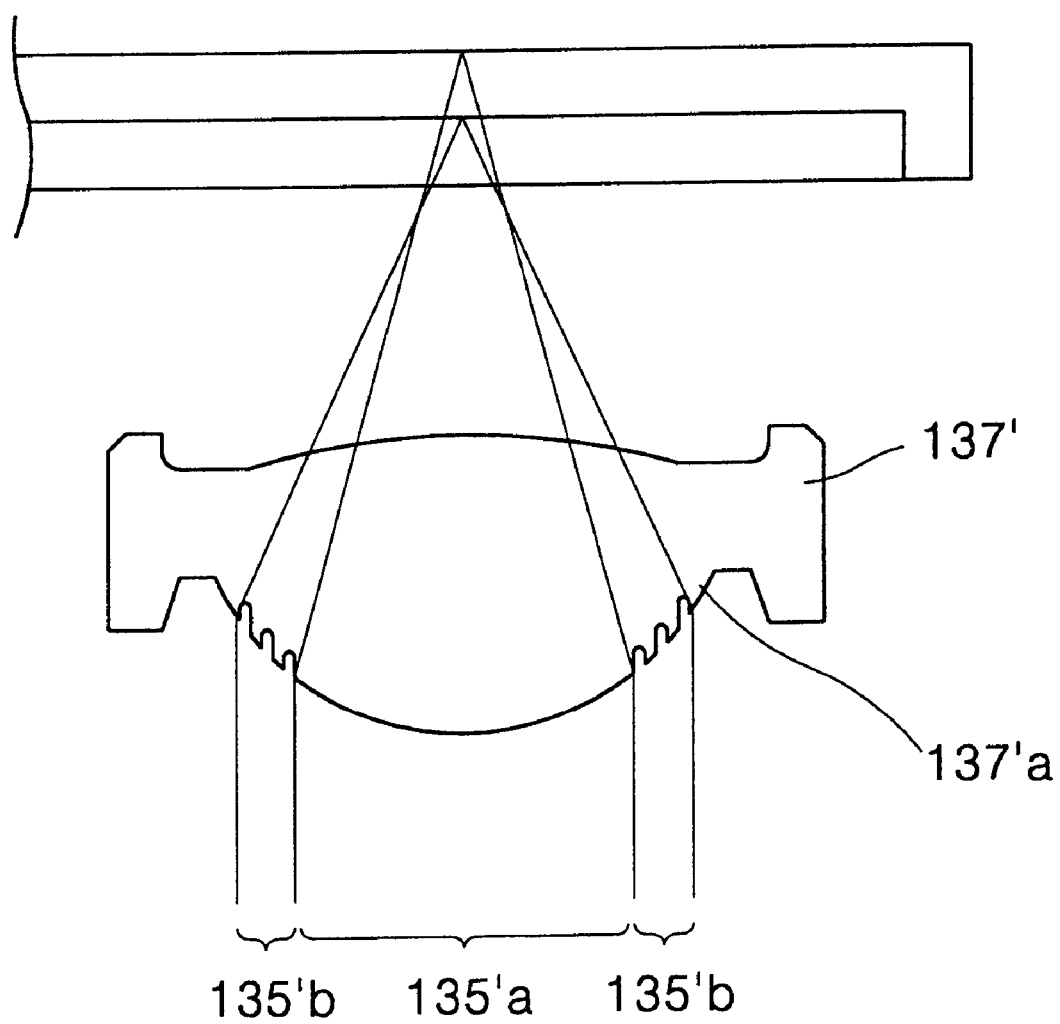
FIG. 10 is a schematic view of a stepped planar lens built-in objective lens as another optical diffraction means constructed according to the principles of the present invention.

The optical diffraction means may be built-in at one side 137'a of an objective lens 137' as shown in FIG. 10, not in the form of a separated stepped planar lens. As in the above-mentioned stepped planar lens 135, the optical diffraction means shown in FIG. 10 may have a first region 135'a for directly transmitting the incident light, and a second region 135'b bounding the first region 135'a, for directly transmitting the first light I and diffractingly transmitting the second light II toward the optical axis. Also, one or more stepped patterns each having a plurality of annular gratings are formed in the second region 135'b, wherein the depths of the gratings become smaller moving away from the optical axis. The stepped pattern formed in the second region 135'b is substantially the same as that mentioned above, and thus a detailed explanation thereof is omitted.

Figure 11:
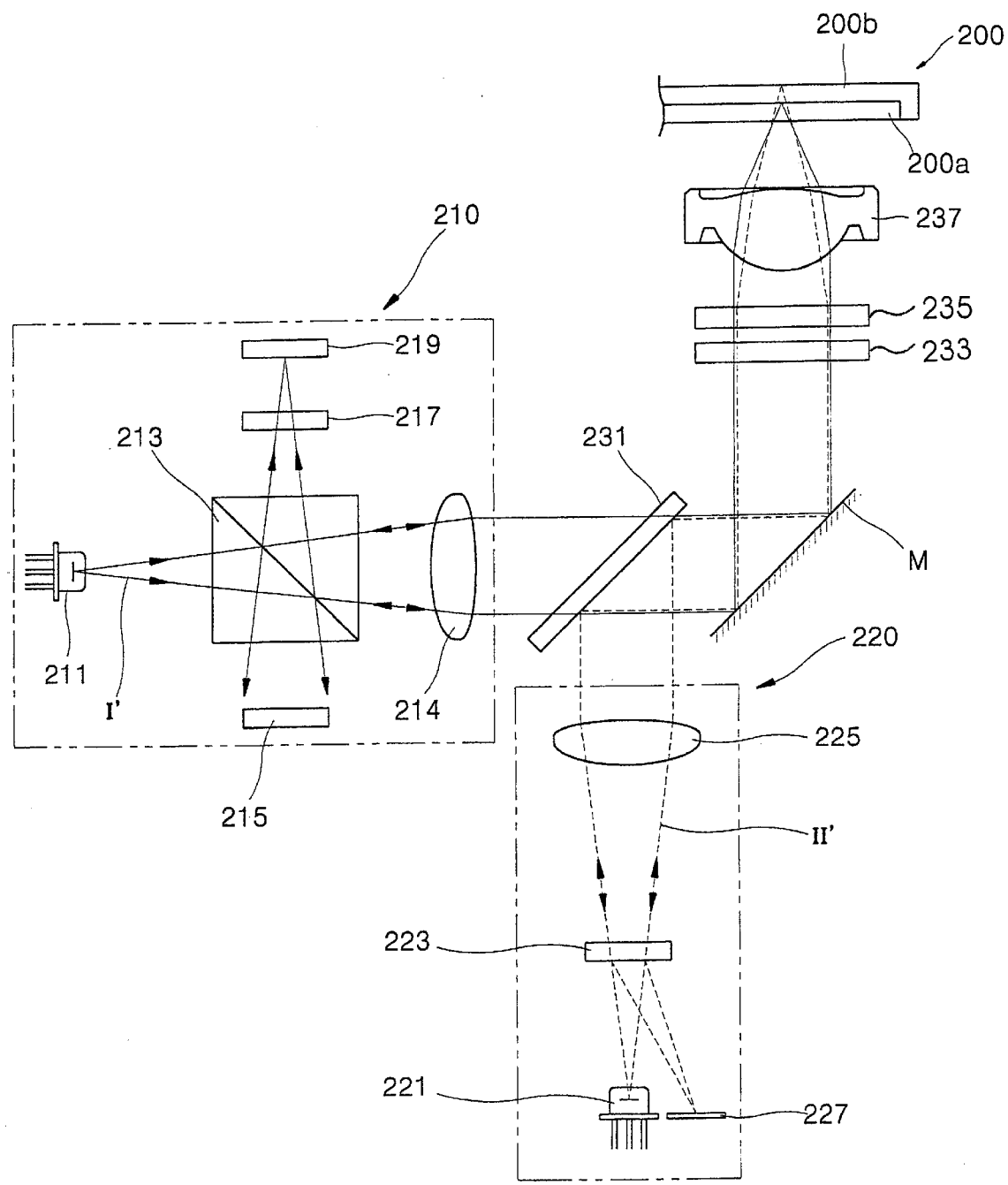
FIG. 11 is a schematic view showing the optical arrangement of a compatible optical pickup constructed as another embodiment of the present invention.

Referring to FIG. 11, a compatible optical pickup according to another embodiment of the present invention may also be constructed with a first optical unit 210 for emitting and receiving a first light I' having a wavelength of about 650 nm, a second optical unit 220 for emitting and receiving a second light II' having a wavelength of about 780 nm, an optical path changing means for changing the paths of the first and second light I' and II', an objective lens 237 for condensing the incident light to form an optical spot on an optical disc 200, and an optical diffraction means. The compatible optical pickup shown in FIG. 11 is substantially the same as the compatible optical pickup illustrated with reference to FIG. 3 in that the optical diffraction means such as a stepped planar lens 235 is disposed on the optical path. However, unlike the compatible optical pick according to the first embodiment of the present invention, the compatible optical pickup of FIG. 11 comprises separate photodetectors, for example, first and second photodetectors 219 and 227, for receiving the light emitted from first and second optical sources 211 and 221, respectively.

The first optical unit 210 uses the first optical source 211 for emitting the first light I', a beam splitter 213 for changing the traveling path of the incident light, a monitoring photodetector 215 for receiving light, which has been emitted from the first optical source 211 and then diverged by the beam splitter 213, to detect the optical output of the first optical source 211, and the first photodetector 219 for receiving light that has been reflected by a relatively thin optical disc 200a and then passed through the beam splitter 213. The first optical unit 210 may further comprise a first collimator lens 214 for changing the radiating incident light into parallel light, and a light receiving lens 217 disposed between the beam splitter 213 and the first photodetector 219. The light receiving lens 217 may be a planar hologram lens as shown in FIG. 11.

The second optical unit 220 has a second optical source 211 for emitting the second light II', a hologram optical element 223 for changing the preceding path of the incident light, and a second photodetector 227 for receiving light that has been reflected by a relatively thick optical disc 200b and diffracted by the hologram optical element 223. The second optical unit 220 may further comprise a second collimator lens 225 for condensing the incident emanated light into parallel light.

The optical path changing means disposed on the optical path between the objective lens 237, and the first and second optical units 210 and 220, which is for changing the traveling path of the light, may use a PBS 231 for transmitting/reflecting the incident light according to polarization direction, and a phase retardation plate 233 for causing lag in-phase to the incident light. The optical diffraction lens uses a stepped planar lens 235 as shown in FIG. 11. The optical diffraction means is substantially the same as the optical diffraction means illustrated with reference to FIGS. 4 through 9, and thus a detailed explanation thereof is omitted.

In the case where the compatible optical pickup according to the present invention, a reflection mirror M is positioned on the optical path and parallel light is incident onto the reflection mirror M, the arrangement of the first and second optical units 210 and 220 and the PBS 231 may be fixed, and the objective lens 237, the stepped planar lens 235, the phase retardation plate 233 and the reflection mirror M may be moved in the radial direction of the optical disc 200 to follow tracks.

The compatible optical pickup according to the present invention, the optical diffraction lens such as the stepped planar lens located on the optical path, has a simple structure and does not need s separate driving thereof, can be applied to optical discs having different formats, for example, CD family media including CD-RW, and DVD. Also, the stepped planar lens can be mass-produced at low cost using a mother substrate having a pattern corresponding to a desired grating pattern. Also, as for the second light for use in recording or reproducing information on or from the CD-RW, most of the light passed through the second region having a NA of 0.3–0.5 is used by being diffracted to the—1st order toward the optical axis, thereby raising the optical efficiency in use relative to the conventional optical pickup. Also, the optical efficiency can be raised by shortening the optical focal length with the first and second collimator lenses, rather than by the optical power of the second optical source alone.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus, comprising:
   a first optical source emitting a first light beam having a predetermined wavelength;
   a second optical source emitting a second light beam having a longer wavelength relative to the first light beam;
   an optical path changing means for changing the traveling path of an incident light beam;
   an objective lens for condensing the first light beam and the second light beam onto optical discs having different thicknesses;
   an optical diffraction means having a first region which directly transmits the first and second light beam incident thereto, and a second region bounding the first region, which directly transmits the incident first light beam and diffractingly transmits the second light beam towards an optical axis; and
   a photodetector for detecting an information signal and an error signal from the first and second light beam which have been reflected by said optical discs and passed through said optical path changing means.

2. The apparatus of claim 1, wherein said optical diffraction means is a stepped planar lens in which at least one stepped pattern period having a plurality of annular gratings is arranged in said second region, wherein the depths of said annular gratings become smaller moving away from the optical axis, and a maximum depth of said annular gratings is a predetermined value.

3. The apparatus of claim 2, wherein at said maximum depth of said annular gratings a 0th-order diffraction efficiency of the first light beam is about 100% and that of the second light beam is about 0%, and a first-order diffraction efficiency of the second light beam is about 75%, where the 0th-order diffraction efficiency is expressed as a percentage of transmitted light with respect to an amount of incident light and where the first-order diffraction efficiency is expressed as a percentage of first-order diffracted light with respect to an amount of incident light.

4. The apparatus of claim 2, wherein said maximum depth of said annular gratings is about 6.4 $\mu$m.

5. The apparatus of claim 2, wherein said stepped pattern comprises a first stepped pattern formed within a radial range of 1000–1150 $\mu$m of said stepped planar lens, and a second stepped pattern formed within a radial range of 1150–1200 $\mu$m.

6. The apparatus of claim 2, wherein said stepped pattern is formed in one side of said stepped planar lens, facing said optical path changing means.

7. The apparatus of claim 1, wherein said optical diffraction means is built-in at one side of said objective lens, facing said optical path changing means.

8. The apparatus of claim 7, wherein at least one unit of said stepped pattern having a plurality of annular gratings is arranged in the second region, wherein the depths of said annular gratings become smaller moving away from the optical axis, and a maximum depth of said annular gratings is a predetermined value.

9. The apparatus of claim 1, further comprising:
   a first collimator lens disposed on the optical path between said second optical source and said optical path changing means, for pre-condensing and transmitting the incident light beam; and
   a second collimator lens disposed on the optical path between said optical path changing means and said objective lens, for condensing and transmitting the incident light beam, to set the optical focal length between said second optical source and said optical discs, thereby raising an optical efficiency.

10. The apparatus of claim 9, further comprising a light receiving lens located between said optical path changing means and said photodetector.

11. The apparatus of claim 10, further comprising a monitoring detector aligned with said second optical source and said first collimator lens.

12. The apparatus of claim 11, further comprising a grating, which diffractingly transmits the incident light beam to detect a tracking error signal, located on the optical path between said first collimator lens and said second optical source.

13. An apparatus, comprising:
   a first light beam source for emitting a first light beam having a wavelength of 650 nm;
   a first photodetector for receiving the first light beam;
   a second light beam source for emitting a second light beam having a wavelength of 780 nm;
   a second photodetector for receiving the second light beam;
   an optical path changing means for changing the paths of the first and second light beams;
   an objective lens for condensing the first and second light beams to form optical spots onto optical discs having different thicknesses; and
   an optical diffraction means having a first region which directly transmits the first and second light beams incident thereto, and a second region bounding the first region, which directly transmits the incident first light beam and diffractingly transmits the second light beam towards an optical axis.

14. The apparatus of claim 13, wherein said optical diffraction means is a stepped planar lens in which at least one stepped pattern period having a plurality of annular gratings is arranged in said second region, wherein the depths of said annular gratings become smaller moving away from the optical axis, and a maximum depth of said annular gratings is a predetermined value.

15. The apparatus of claim 14, wherein at said maximum depth of said annular gratings a 0th-order diffraction efficiency of the first light beam is about 100% and that of the second light beam is about 0%, and a first-order diffraction efficiency of the second light beam is about 75%, where the 0th-order diffraction efficiency is expressed as a percentage of transmitted light with respect to an amount of incident light and where the first-order diffraction efficiency is expressed as a percentage of first-order diffracted light with respect to an amount of incident light.

16. The apparatus of claim 14, wherein the maximum depth of said annular grating is about 6.4 $\mu$m.

17. The apparatus of claim 14, wherein said stepped pattern comprises a first stepped pattern formed within a radial range of 1000–1150 $\mu$m of the stepped planar lens, and a second stepped pattern formed within a radial range of 1150–1200 $\mu$m.

18. The apparatus of claim 14, wherein said stepped pattern is formed in one side of said stepped planar lens, facing said optical path changing means.

19. The apparatus of claim 13, wherein the optical diffraction means is built-in at one side of said objective lens, facing said optical path changing means.

20. The apparatus of claim 19, wherein at least one unit of a stepped pattern having a plurality of annular gratings is arranged in said second region, wherein the depths of said annular gratings become smaller moving away from the optical axis, and a maximum depth of said annular gratings is a predetermined value.

21. The apparatus of claim 20, wherein the maximum depth of said annular gratings is about 6.4 $\mu$m.

22. The apparatus of claim 21, further comprising:
   a first collimator lens disposed on the optical path between said second light beam source and said optical path changing means, for pre-condensing and transmitting the incident light beam; and
   a second collimator lens disposed on the optical path between said optical path changing means and said objective lens, for condensing and transmitting the incident light beam, to set the optical focal length between said second light beam source and said optical discs, thereby raising an optical efficiency.

23. The apparatus of claim 22, further comprising a light receiving lens located between said optical path changing means and said first photodetector.

24. The apparatus of claim 23, wherein said light receiving lens is a planar hologram lens.

25. The apparatus of claim 24, further comprising a monitoring photodetector aligned with said planar hologram lens and said first photodetector.

26. The apparatus of claim 25, further comprising a hologram optical element located in between said second light beam source and said second collimator lens.

27. An apparatus, comprising:
   a first optical source emitting a first light beam having a wavelength of 650 nm;
   a second optical source emitting a second light beam having a wavelength of 780 nm;
   a first polarization beam splitter changing the traveling path of an incident light beam, said first polarization beam splitter located in an optical path of said first optical source;
   a second polarization beam splitter located in an optical path of said second optical source;
   an objective lens for condensing the first light beam and the second light beam onto optical discs having different thicknesses;
   a stepped planar lens having a first region which directly transmits the first and second light beams incident thereto, and a second region bounding said first region in which at least one stepped pattern having a plurality of annular gratings is arranged in said second region, wherein the depths of said annular gratings become smaller moving away from the optical axis, and the maximum depth of said annular gratings is 6.4 $\mu$m;
   a photodetector for detecting an information signal and an error signal from the first and second light beam which have been reflected by said optical discs and passed through said optical path changing means;

a first collimator lens disposed on the optical path between said second optical source and said optical path changing means, for pre-condensing and transmitting the incident light beam;

a second collimator lens disposed on the optical path between said optical path changing means and said objective lens, for condensing and transmitting the incident light beam, to set the optical focal length between said second optical source and said optical discs, thereby raising an optical efficiency;

a planar hologram lens located between the said optical path changing means and said photodetector;

a monitoring detector aligned with said second optical source and said first collimator lens; and a grating which diffractingly transmits the incident light beam to detect a tracking error signal, is located on the optical path between said first collimator lens and said second optical source.

28. The apparatus of claim 27, wherein said stepped pattern comprises a first stepped pattern formed within a radial range of 1000–1150 μm of said stepped planar lens, and a second stepped pattern formed within a radial range of 1150–1200 μm.

29. The apparatus of claim 27, wherein said stepped pattern is formed in one side of said stepped planar lens, facing said optical path changing means.

30. The apparatus of claim 27, wherein the optical diffraction means is built-in at one side of the objective lens, facing said optical path changing means.

31. A method, comprising the steps of:

emitting a first light beam from a first optical source, said first light beam of predetermined wave length;

emitting a second light beam from a second optical source, said second light beam having a longer wavelength relative to said first light beam;

changing a path of said first light beam emitted from said first optical source with an optical path changing means;

changing a path of said second light beam emitted from said second optical source with an optical path changing means;

condensing said first light beam and said second light beam into parallel rays with a collimator lens;

transmitting directly to an objective lens said first light beam and said second light beam incident on a first circular region centrally located on a stepped planar lens;

transmitting directly to said objective lens said first light beam incident on a second region bounding said first region;

transmitting diffractingly said second light beam toward an optical axis and said objective lens using a stepped planar lens in which at least one stepped pattern period having a plurality of annular gratings is arranged in said second region, wherein the depths of said annular gratings become smaller moving away from said optical axis, and said maximum depth of said annular gratings has a predetermined value;

forming an optical spot on a first optical disc by condensing said first light beam with said objective lens; and forming an optical spot on a second optical disc by condensing said second light beam with said objective lens, said second optical disc being thicker than said first optical disc.

32. The method of claim 31, wherein said first optical disc is selected from a group consisting of a Digital Versatile Disc, a Recordable Digital Versatile Disc, and a ReWritable Digital Versatile Disc.

33. The method of claim 32, wherein said second optical disc is selected from a group consisting of a Compact Disc, a Recordable Compact Disc, and a ReWritable Compact Disc.

34. The method of claim 31, wherein the maximum depth of said annular grating is about 6.4 μm.

* * * * *